United States Patent
Sasaki et al.

(10) Patent No.: US 7,106,679 B2
(45) Date of Patent: Sep. 12, 2006

(54) INFORMATION REPRODUCING APPARATUS AND METHOD, AND ERROR CORRECTION SYSTEM

(75) Inventors: Takashi Sasaki, Saitama (JP); Masao Yoshida, Saitama (JP); Kazunori Matsuo, Saitama (JP); Shinichi Naohara, Saitama (JP); Yasuhisa Okamoto, Saitama (JP)

(73) Assignee: Pioneer Corporation, Tokyo (JP)

( * ) Notice: Subject to any disclaimer, the term of this patent is extended or adjusted under 35 U.S.C. 154(b) by 531 days.

(21) Appl. No.: 10/632,114

(22) Filed: Aug. 1, 2003

(65) Prior Publication Data

US 2004/0073853 A1    Apr. 15, 2004

(30) Foreign Application Priority Data

Aug. 2, 2002  (JP) ............................ 2002-225742

(51) Int. Cl.
*G11B 7/00*  (2006.01)

(52) U.S. Cl. ................. 369/53.35; 369/53.1; 369/53.15

(58) Field of Classification Search ............. 369/47.33, 369/47.34, 47.32, 47.1, 53.15, 53.12, 53.1, 369/53.35
See application file for complete search history.

(56) References Cited

U.S. PATENT DOCUMENTS 5,148,432 A * 9/1992 Gordon et al. ................. 714/7

FOREIGN PATENT DOCUMENTS

| EP | 0 795 813 A2 | 9/1997 |
|----|------|------|
| EP | 0 821 356 | 1/1998 |
| EP | 0 822 553 | 2/1998 |
| EP | 0 836 187 A1 | 4/1998 |
| EP | 0 865 041 | 9/1998 |
| EP | 0 883 113 | 12/1998 |
| JP | 9-282809 | 10/1997 |
| JP | 2000-311347 | 11/2000 |

* cited by examiner

*Primary Examiner*—Nabil Hindi
(74) *Attorney, Agent, or Firm*—Drinker Biddle & Reath LLP (57) ABSTRACT

An information reproducing apparatus improved is provided with: an optical pickup (11) for reading record information recorded on an optical disc (100) and outputting a read signal; an error correction circuit (15) for executing an error correction process with respect to the outputted read signal and outputting output data through the error correction process corresponding to the record information; and a buffering memory device (17) for buffering the outputted output data. The apparatus is further provided with a microcomputer (20) for altering the error correction process in the error correction circuit depending on a memory status of the buffering memory device, if in the error correcting device, an error is detected in the read signal or an error ratio of the error becomes greater than a predetermined threshold value.

22 Claims, 6 Drawing Sheets

INFORMATION REPRODUCING APPARATUS AND METHOD, AND ERROR CORRECTION SYSTEM

BACKGROUND OF THE INVENTION

1. Field of the Invention

The present invention relates to an information reproducing apparatus and method such as a DVD player, a CD (Compact Disc) player or the like, and further relates to an error correction system for the information reproducing apparatus.

2. Description of the Related Art

Typically in the information reproducing apparatus such as a DVD player, a CD player or the like, a light beam to read information is irradiated from a laser device in an optical pickup onto an information recording medium such as a DVD, a CD or the like. A photodetector in the optical pickup receives the reflection light from a recording surface of the information recording medium to output a RF (Radio Frequency) signal and the like. The outputted RF signal is subjected to an equalizing processing and further to a binarization processing, a decoding processing, an error correction process and so on. Thereby, the output data through the error correction is obtained.

Specifically, the correction process may be of a scheme using the error correction data indicating the sum of data values in each row or in each column of the error correction data block arranged in a matrix of a certain range of the record data, the error correction data being recorded in addition to the record data. For the sake of convenience, herein, the error correction using the error correction data, which indicates the sum of data values in each row (i.e., each alignment in a lateral or horizontal direction), is referred to as a "C1 correction", while the error correction using the error correction data, which indicates the sum of data values in each column (i.e., each alignment in a longitudinal or vertical direction), is referred to as a "C2 correction".

Alternatively, there are other kinds of known error corrections such as a "multiple correction" represented by a "double correction" for executing the error correction using the error correction data or the record signal obtained as a result of a double reading by repeating a data reading twice with respect to the same recording area, or a "quadruple correction" for executing the error correction using the error correction data or the record signal obtained as a result of a quadruple reading by repeating a data reading four times with respect to the same recording area.

Nevertheless, in the conventional information reproducing apparatus mentioned above, only one among the error correction schemes is employed for the same kind of recording medium or the individual information reproducing apparatus. Similarly, the repeating number of the multiple correction is fixed with regard to the same kind of recording medium or the individual information reproducing apparatus. Additionally, parameters to define reproducing conditions for the information reproducing apparatus, such as a rotation number of a spindle motor, a characteristics setting of the equalizer and the like, are inherently fixed with regard to the same kind of recording medium or the individual information reproducing apparatus.

As a result, in spite of retrying the error correction by repeating the processes after the data reading, or increasing the volume of data as the basis of the error correction, immediately after the failure in obtaining the satisfactory result of the first error correction, the improvement in an error avoidance effect is extremely limited due to a remained cause of errors, unless the cause of errors is eliminated or reduced. With regard to some causes of errors, the improvement in the error avoidance effect is hardly expected, rather demerits from repeating the error correction, such as the increase in the processing time or the processing cost, become manifest.

As described above, the conventional information reproducing apparatus and method include the technical problem for the improvement in the error avoidance effect.

SUMMARY OF THE INVENTION

The present invention has been accomplished in view of the above problems for example. It is therefore an object of the present invention to provide the information reproducing apparatus and method improved in the error avoidance effect, and further provide the error correction system for the information reproducing apparatus.

The above object of the present invention can be achieved by an information reproducing apparatus provided with: a reading device for reading record information recorded on a recording medium and outputting a read signal; an error correcting device for executing an error correction process with respect to the outputted read signal and outputting output data through the error correction process corresponding to the record information; a memory device for buffering the output data; and a correction controlling device for altering the error correction process in the error correcting device depending on a memory status of the memory device, if in the error correcting device, an error is detected in the read signal and/or if an error ratio of the error becomes greater than a predetermined threshold value, wherein the memory device outputs at least temporarily the output data through the error correction process that is altered by the correction controlling device, if the error is detected and/or if the error ratio becomes greater than the predetermined threshold value.

The above object of the present invention can be also achieved by an information reproducing method provided with the processes of: reading record information recorded on a recording medium and outputting a read signal; executing an error correction process with respect to the outputted read signal and outputting output data through the error correction process corresponding to the record information; buffering the outputted output data using a memory device; and altering the error correction process depending on a memory status of the memory device, if in the error correcting process, an error is detected in the read signal and/or an error ratio of the error becomes greater than a predetermined threshold value, wherein the output data through the error correction process that is altered at the altering process is outputted at least temporarily from the memory device, if the error is detected and/or if the error ratio becomes greater than the predetermined threshold value.

The above object of the present invention can be also achieved by an error correction system provided for an information reproducing apparatus having a reading device for reading record information recorded on a recording medium and outputting a read signal, the error correction system provided with: an error correcting device for executing an error correction process with respect to the outputted read signal and outputting output data through the error correction process corresponding to the record information; a memory device for buffering the outputted output data; and a correction controlling device for altering the error correction process in the error correcting device depending on a memory status of the memory device, if in the error correcting device, an error is detected in the read signal and/or if an error ratio of the error becomes greater than a predetermined threshold value, wherein the memory device outputs at least temporarily the output data through the error correction process that is altered by the correction controlling device, if the error is detected and/or if the error ratio becomes greater than the predetermined threshold value.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

The embodiments of the information reproducing apparatus according to the present invention will now be discussed, referring to drawings. In the embodiments, the information reproducing apparatus according to the present invention is applied to the reproducing apparatus for optical discs such as a CD player, a DVD player or the like. The embodiments include an embodiment of the error correction system according to the present invention. Further in the embodiments, an embodiment of the information reproducing method according to the present invention is performed.

First Embodiment

Figure 1:
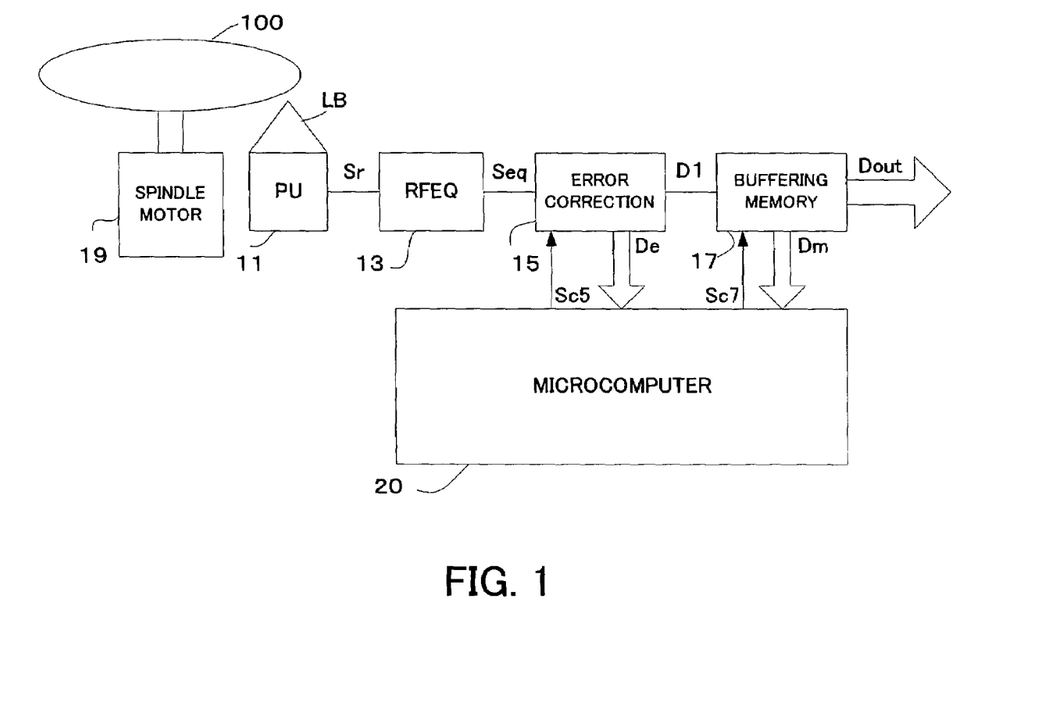
FIG. 1 is a block diagram showing an information reproducing apparatus according to a first embodiment of the present invention.

Firstly, the construction of the information reproducing apparatus in the first embodiment will be now discussed, referring to FIG. 1. FIG. 1 is a block diagram showing the first embodiment.

In FIG. 1, the information reproducing apparatus is provided with an optical pickup 11 as an example of the reading device, an RF equalizer (RFEQ) 13, an error correction circuit 15 as an example of the error correcting device, a buffering memory device 17 as an example of the memory device, a microcomputer 20 as an example of the correction controlling device, and a spindle motor 19 for rotating an optical disc 100 as an example of the recording medium.

The optical pickup 11 includes a semiconductor laser device and a photodetector to irradiate a reading light beam LB onto the recording surface of the optical disc 100 and detect the reflection or transmission of the light. Thereby, the information recorded on the optical disc 100 is read to be outputted as a read signal Sr.

The RF equalizer 13 has a frequency dependent gain characteristics so as to apply a variable gain, depending on the frequency of the read signal Sr, onto the read signal Sr. For example, if the optical disc 100 is a CD, the gain for the read signal Sr having the time length of 3T is increased to 3 dB, with respect to the read signal Sr within a range variable from 3T to 11T (wherein T denotes a minimum unit time length due to a pit). If the optical disc 100 is a DVD, the gain for the read signal Sr having the time length of 3T is increased to 3 dB, with respect to the read signal Sr is within a range variable from 3T to 14T. The RF equalizer 13 is arranged to alter the cutoff frequency of the read signal Sr depending on the optical disc 100. Thereby, regardless of the frequency of the read signal Sr, a stable signal detection is possible at the later stage.

The error correction circuit 15 is operative to execute the error correction process and the decoding processing with respect to the read signal Seq already equalized and outputted from the RF equalizer 13, and operative to output an output data D1 through the error correction process corresponding to the record information recorded on the optical disc 100. For example, if the optical disc 100 is a DVD, an 8–16 decoding corresponding to an 8–16 encoding and an interleave are executed for each physical sector, and the error correction process is executed for each ECC (Error Correction Code) block. If the optical disc 100 is a CD, an EFM (Eight Fourteen Modulation) decoding is executed and the error correction process is executed for each frame.

As the error correction circuit 15 decodes the read signal Seq to thereby generate the data in the unit of the ECC block, the parity is appended to this data in the unit of the ECC block. The error correction in the error correction circuit 15 is executed in a combination of the C1 correction for rows (transversal direction) and the C2 correction for columns (vertical direction) based on the ECC block. More specifically, one ECC block is made of rows of 182 bytes and columns of 208 bytes, and correctable up to 5 bytes in a row. Such a correction is executed as the C1 correction (which is also referred to as "PI (Parity of Inner-code) correction") for all 208 rows. Incidentally, in a case of errors more than 5 bytes in a row, the correction of the row is impossible. On the other hand, errors can be corrected up to 16 bytes in a column. Such a correction is executed as the C2 correction (which is also referred to as "PO (Parity of Outer-code) correction") for all 182 columns. Incidentally, in a case of errors more than 16 bytes in a column, the correction of the column is impossible.

Under control of the control signal Sc5 from the microcomputer 20, the error correction circuit 15 can change at least one of the correction scheme such as the C1 correction or the C2 correction and the repeating correction number (i.e., the number of times of repeating the correction) such as the double correction or the quadruple correction.

For example, the error correction circuit 15 may retain a control bit, which is to select either one of predetermined different correction methods, within the inner register thereof, or may retain a control bit, which is to determine the repeating correction number, within the inner register thereof. Further, these control bit may be altered or rewritten by the control signal Sc 5 from the microcomputer 20. For example, the control bit may be changed from a bit configuration "0000", which indicates the method of executing the C2 correction after the C1 correction, to a bit configuration "1000", which indicates the method of executing the C1 correction after the C2 correction. Alternatively, the change from a bit configuration "0010", which indicates the double correction, to a bit configuration "0100", which indicates the quadruple correction is possible.

Furthermore, the error correction circuit 15 is arranged to output error information De, which indicates the error generation status, to the microcomputer 20, regularly or irregularly. The error information De may be a kind of information indicating the total number of corrections or the number of the uncorrectable rows in the result of the C1 correction for each ECC block, or another kind of information indicating the total number of corrections or the number of the uncorrectable columns in the result of the C2 correction for each ECC block.

Alternatively, if the optical disc 100 is a DVD, the error information De may be a kind of information indicating the EDC (Error Detecting Code) error generation in the case of the existence of at least one uncorrectable row or column in one ECC block, or may be another kind of information indicating no EDC (Error Detecting Code) error generation in the case of non-existence of uncorrectable row or column in one ECC block. For example, if the optical disc is a CD, the error information may be a kind of information indicating an error ratio, i.e. a ratio of the number of error frames to the number of the total frame within a predetermined time unit, or may be another kind of information indicating the number of error frames within a predetermined time unit. Such an EDC error generation or an error ratio may be calculated at the error circuit 15, or may be calculated at the microcomputer 20, on the basis of the error information De.

The buffering memory device 17 is operative to buffer the output data D1 outputted from the correction circuit 15. If no error is detected in the read signal Seq at the error correction circuit 15 or the error ratio is no greater than a predetermined threshold value, the buffering memory 17 outputs the output data D1 after buffering into the successive circuit such as a decoder, as the output data Dout. Further, the buffering memory device 17 is operative to output memory status information Dm, which indicates the memory status i.e., the data amount or level of residual data in the buffering memory device, which can be used from the buffering memory device, into the microcomputer 20, regularly or irregularly.

The microcomputer 20 is operative to judge whether or not any error is detected in the read signal Seq and/or whether or not the error ratio is greater than the predetermined threshold value, on the basis of the error information De from the error correction circuit 15. If any error is detected in the read signal Seq and/or if the error ratio is greater than the predetermined threshold value, the microcomputer 20 controls the error correction circuit 15 using the control signal Sc5, so as to alter the error correction process in the error correction circuit 15, depending on the memory status, which is indicated by the memory status information Dm.

Furthermore, the microcomputer 20 is arranged to control the buffering memory device 17 using the control signal Sc7, in such a manner that the buffering memory device 17 outputs the output data D1, which has already been altered in the error correction process, as the output data Dout at least temporarily after buffering thereof, if any error is detected in the error correction circuit and/or if the error ratio is greater than the predetermined threshold value.

Incidentally, the buffering memory device 17 is operative to abandon the output data D1 in the case of the error being detected and/or in the case of the error ratio being greater than the predetermined threshold value. Nevertheless, instead of abandoning, the output data D1 may be used for the later error correction process together with the read signal Seq obtained after altering the error correction process or the repeating correction number.

The microcomputer 20 preferably alters at least one of the correction scheme and the repeating correction number in the error correction process so as to prevent the memory status (i.e., the data amount or level of the residual data in the buffering memory device 17) indicated by the memory status information Dm from becoming zero (i.e., to prevent the buffering memory device 17 from being empty). More specifically, the alteration to empty the buffering memory device 17 in the correction process is avoided, by performing an inversely calculating operation from the memory status. Therefore, the microcomputer 20 terminates repeating the error correction process before the memory status (i.e., the residual data) in the buffering memory device 17 becomes zero, if any error is detected and/or if the error ratio is greater than the predetermined threshold value, after the error correction process is repeated to the same record information Seq more than one time. More preferably, the microcomputer 20 is operative to output the output data Dout, whose correction process is not completed, through the buffering memory device 17.

Conversely speaking, the microcomputer 20 alters repeatedly at least one of the correction scheme and the repeating correction number in the error correction process, until no error is detected and/or until the error ratio becomes no greater than the predetermined threshold value, insofar as the memory status (i.e., the residual data) in the buffering memory device 17 does not become zero. That is, the error correction process that is altered by the microcomputer 20 is sequentially performed. The microcomputer 20 is arranged to reset the correction scheme or the repeating correction number in the error correction circuit to the predetermined default setting, if no error is detected and/or if the error ratio becomes no greater than the predetermined threshold value in the error correction circuit 15, after the error correction process that is the one altered by the microcomputer 20 is performed.

The reproducing operation including the error correction according to the first embodiment will now be discussed.

Firstly, the optical pickup 11 detects light reflected or transmitted in response to the irradiation of the reading light beam LB onto the optical disc 100. The RF equalizer 13 applies the equalizing process onto the read signal Sr.

Next, the error correction circuit 15 applies the decoding process and the error correcting process with respect to the equalized read signal Seq to thereby output the output data D1 to the buffering memory device 17, while the error information De is outputted to the microcomputer 20, regularly or irregularly.

Then, the microcomputer 20 judges whether or not any error is detected in the read signal Seq and/or whether or not the error ratio becomes greater than the predetermined threshold value, on the basis of the error information De.

In the reproducing operation, the buffering memory device 17 buffers the output data D1. If no error of the read signal Seq is detected and/or if the error ratio becomes no greater than the predetermined threshold value from the first, with regard to the output data D1 within the predetermined unit such as the error correction data block, the output data D1 after buffering is outputted to the successive circuit as the output data Dout. In the meantime, the memory status information Dm indicating the memory status is outputted to the microcomputer 20, regularly or irregularly.

If the microcomputer 20 judges that any error in the read signal Seq is detected and/or that the error ratio is greater than the predetermined threshold value, the correction scheme or the repeating correction number in the error correction process to be performed in the error correction circuit 15 is altered depending on the memory status indicated by the memory status information Dm, under control of the control signal Sc5. For example, "a correction scheme in that the C2 correction is performed after the C1 correction" as the default correction process may be altered to "a correction scheme in that the C1 correction is performed after the C2 correction", "a correction scheme in that C2 correction is performed after the C1 correction is performed further after the C2 correction" or "a correction scheme in that the C1 correction is performed after the C2 correction is performed further after the C1 correction is performed still after the C2 correction", or may be altered from a "double correction" to a "quadruple correction". Relating to this, the microcomputer 20 alters the correction scheme or the repeating correction number to prevent the memory status (i.e., the data amount or level of the residual data in the buffering memory device 17) indicated the memory status information Dm from becoming zero.

The buffering memory 17 abandons the output data D1 with any error being detected or the error ratio becoming greater than the predetermined threshold value. Then, the buffering memory 17 buffers and outputs the output data D1 after the error correction process that is altered by the microcomputer 20 as the output data Dout.

Particularly in this embodiment, the different error correction process in the altered correction scheme or the altered repeating correction number is attempted with respect to the same record information, instead of repeating the correction process in the same correction scheme or the same repeating correction number with respect to the same record information. As a result, as for a certain cause of error, the error can be avoided very effectively. Incidentally, although there remained the possibility of no improvement in the error avoidance effect by the alternation, the possibility of error avoidance is very high by the alteration of the correction scheme or the repeating correction number, since it is with regard to the record information with error remaining at the default correction scheme or repeating correction number. Conversely, with regard to the record information without error at the default correction scheme or repeating correction number, although the alteration of the correction scheme or repeating correction number would decrease the error avoidance effect, in such a case, there is in fact no need to alter the correction scheme or repeating correction number.

In this manner, the selective alteration of the correction scheme or repeating correction number performed only in the case of error generation inevitable with the default or initial error correction assists the improvement in the error avoidance effect.

Particularly in this embodiment, the error correction process is altered depending on the memory status. Therefore, the alteration with almost full use of available time is possible insofar as the buffering memory device 17 has available space, while the memory status (i.e., the data amount or level of the residual data in the buffering memory device) is prevented from becoming zero. For example, if the memory status is high at the error generation, it is useful to change temporarily the correction scheme to one involving more correction time or to increase the repeating correction number. Conversely, if the memory status is low at the error generation, it is useful to change temporarily the correction scheme to one involving less correction time, otherwise to decrease or not to increase the repeating correction number. In any case, the maximum or optimal alteration of the error correction process is possible, depending on the memory status prevented from becoming zero, resulting in the highly effective and remarkable improvement in the error avoidance effect.

In this manner, if the alteration of the correction scheme or the repeating correction number in the error correction circuit 15 succeeds in the error correction process, the output data Dout obtained via the error correction process is outputted from the buffering memory device 17.

On the other hand, the microcomputer 20 terminates repeating the error correction process, before the memory status in the buffering memory device 17 becomes zero, if any error is detected and/or if the error ratio becomes greater than the predetermined threshold value, after the error correction process is repeated with respect to the same record information Seq more than once. That is, in this case, the error correction is aborted. As for a certain kind of contents information, even if there is a little amount of data impossible of error correction, it is often not sensed audio-visually by human at all or almost at all. Therefore, in practice, it is rather effective to abort the error correction process for proceeding the reproduction, than timeout due to the failure in the error correction.

Thus, according to the information reproducing apparatus of the embodiment, the buffering memory device 17 is operative to output the output data Dout, which does not need any error correction from the beginning, or the output data Dout, which has been error-corrected by the error correction process. Alternatively, the output data Dout failed in the error correction with the correction scheme or the repeating correction number being altered may be outputted.

As discussed above, according to the present invention, the error avoidance effect is remarkably improved, when the optical disc 100 is reproduced in the information reproducing apparatus.

Second Embodiment

Figure 2:
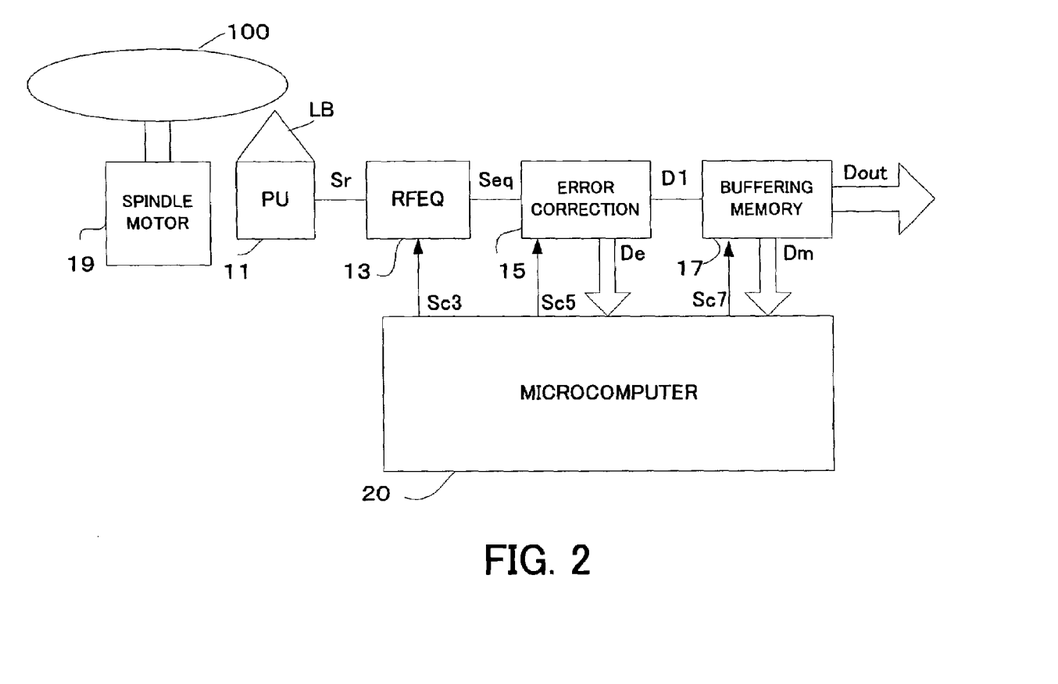
FIG. 2 is a block diagram showing an information reproducing apparatus according to a second embodiment of the present invention.

The construction of the information reproducing apparatus according to the second embodiment will now be discussed, referring to FIG. 2. FIG. 2 is a block diagram showing the second embodiment. In FIG. 2, components same as those of the first embodiment shown in FIG. 1 carry the same reference numerals, and the explanations thereof are omitted as appropriate.

As shown in FIG. 2, according to the second embodiment, the signal processing device of the present invention is embodied in the RF equalizer 13. The microcomputer 20 is operative to output the control signal Sc5 to the RF equalizer 13 so as to alter the equalizing processing (a kind of signal process) in the RF equalizer 13, depending on the memory status indicated by the memory status information Dm. For example, if the memory status (i.e., the data amount or level of the residual data in the buffering memory device) is in a predetermined appropriate range, the gain for the read signal Sr having the time 3T is raised from 3 dB to 6 dB in the equalizing processing or the cutoff frequency is changed. In this case, the error correction may be altered similar to the first embodiment or may not be altered. More preferably, several cases are assumed depending on the memory status: in one case, the equalizing processing is altered; in the other case, the error correction process is altered. Although the correction control may be more complicated depending on the numbers of assumed cases, each case may be further divided into three or more sub-cases. Other constructions are the same as the first embodiment shown in FIG. 1.

Particularly in this embodiment, the error correction process is attempted again with respect to the same record information after the characteristics of the equalizing processing is altered, instead of repeating the error correction process under the same reproducing condition with respect to the same record information. As a result, as for a certain cause of errors, the error generation is avoided very effectively. Particularly, with regard to the record information with the error being generated by the default equalizing processing, the possibility of the error avoidance by altering the characteristics of the equalizing processing is very high.

Thus, the selective alteration of the characteristics in the equalizing processing and/or the error correction process to be performed only in the case of the error generation inevitable with the default error correction assists the total improvement in the error avoidance effect.

Particularly in this embodiment, further, the equalizing processing or the error processing is altered depending on the memory status. Therefore, the various alterations with full use of available time are possible insofar as the buffering memory device 17 stores the available data, while the memory status (i.e., the amount or level of the data stored in the buffering memory device) is prevented from becoming zero. For example, if the memory status is high at the error generation, it is useful to change temporarily the equalizing processing to one involving more equalizing time or the correction scheme to one involving more correction time otherwise to increase the repeating correction number. Conversely, if the memory status is low at the error generation, it is useful to change temporarily the correction scheme to one involving less correction time while the equalizing processing is not altered, otherwise to decrease the repeating correction number. In any case, the maximum or optimal alteration of the error correction process or the equalizing processing is possible, depending on the memory status within a range to prevent it from becoming zero, resulting in the highly effective and remarkable improvement in the error avoidance effect.

As discussed above, according to the present invention, the error avoidance effect is remarkably improved, when the optical disc 100 is reproduced in the information reproducing apparatus.

Incidentally, the RF equalizer according to the present invention capable of changing the gain characteristics depending on the frequency may be the type capable of changing such a gain characteristics set in a digital mode with a bit setting from the microcomputer. For example, a bit setting "0000" for 3 dB may be changed to a bit setting "0010" for 6 dB under control of the microcomputer, as appropriate.

Third Embodiment

Figure 3:
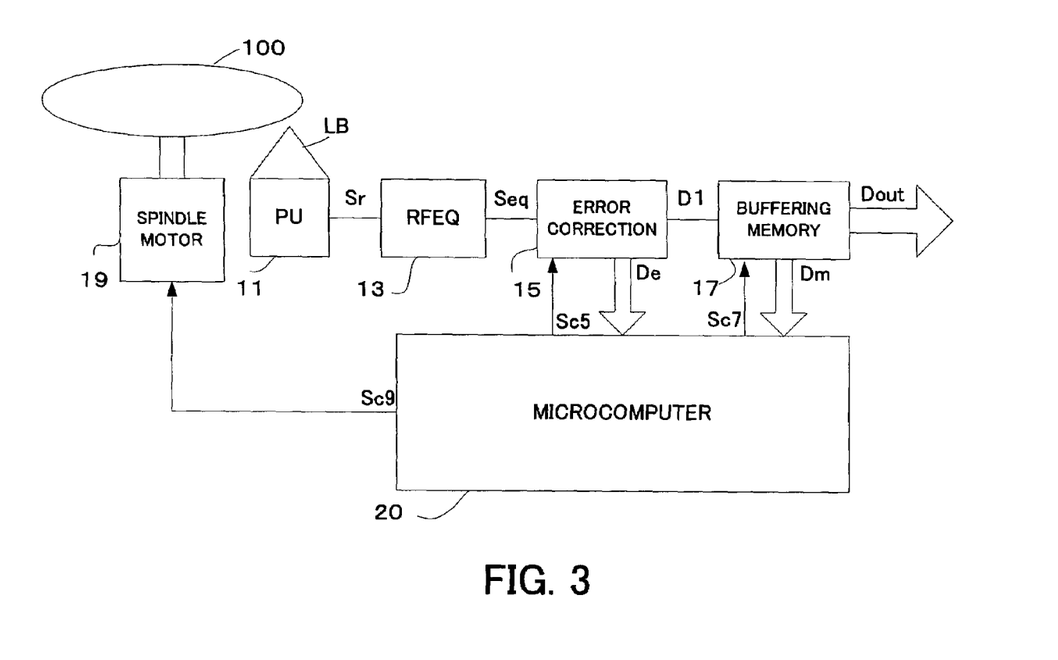
FIG. 3 is a block diagram showing an information reproducing apparatus according to a third embodiment of the present invention.

The construction of the information reproducing apparatus according to the third embodiment will now be discussed, referring to FIG. 3. FIG. 3 is a block diagram showing the third embodiment. In FIG. 3, components same as those of the first embodiment shown in FIG. 1 carry the same reference numerals, and the explanations thereof are omitted as appropriate.

As shown in FIG. 3, according to the third embodiment, the controllable moving device of the present invention is embodied in the spindle motor 19. The microcomputer 20 is operative to output the control signal Sc9 to the spindle motor 19 so as to alter the rotating number (as one kind of parameter) of the spindle motor 19, depending on the memory status indicated by the memory status information Dm. For example, if the memory status is in a predetermined appropriate range, the rotating number of the spindle motor 19 may be decreased from 4,000 rps (round per second) to 2,000 rps. In this case, the error correction may be altered similar to the first embodiment or may not be altered. More preferably, several cases are assumed depending on the memory status: in one case, the rotating number of the spindle motor is altered; in the other case, the error correction process is altered. Incidentally, although the correction control may be more complicated depending on the numbers of assumed cases, each case may be further divided into three or more sub-cases. Other constructions are the same as the first embodiment shown in FIG. 1.

Particularly in this embodiment, the error correction process is attempted again with respect to the same record information after the rotation number of the spindle motor 19 is changed, instead of repeating the error correction process under the same reproducing condition with respect to the same record information. As a result, as for a certain cause of error, the error generation is avoided very effectively. Particularly, with regard to the record information with the error being generated at the default rotating number, the possibility of the error avoidance by altering the rotating number is very high.

Thus, the selective alteration of the rotation number of the spindle motor 19 and/or the error correction process to be performed only in the case of the error generation inevitable with the default error correction assists the total improvement in the error avoidance effect.

Particularly in this embodiment, further, the rotation number of the spindle motor 19 or the error processing is altered depending on the memory status. Therefore, the various alterations with full use of available time are possible insofar as the buffering memory device 17 stores the available data, while the memory status is prevented from becoming zero. For example, if the memory status is high at the error generation, it is useful to perform the time-consuming operation of changing the rotating number of the spindle motor 19 or to change the correction scheme to one involving more correction time, as well as to increase the repeating correction number. Conversely, if the memory status is low at the error generation, it is useful to change temporarily the correction scheme to one involving less correction time while the rotation number of the spindle motor 19 is not altered, as well as to decrease the repeating correction number. In any case, the maximum or optimal alteration of the error correction process or the rotation number of the spindle motor 19 is possible, depending on the memory status within a range to prevent it from becoming zero, resulting in the highly effective and remarkable improvement in the error avoidance effect.

As discussed above, according to the present invention, the error avoidance effect is remarkably improved, when the optical disc 100 is reproduced in the information reproducing apparatus.

Incidentally, in the third embodiment, the controllable moving device is exemplified in the spindle motor 19, but the controllable moving device may be embodied, instead of the spindle motor 19, in a servo control device for a focus actuator or tracking actuator disposed at the optical pickup 11. In this case, a servo gain such as a focus servo gain or a tracking servo gain in the servo control device may be employed as the parameter, instead of the rotation number. In this arrangement, the selective alteration of the servo gains depending on the memory status performed only in the case of the error generation inevitable with the default error correction assists the improvement in the error avoidance effect.

Alternatively, the controllable moving device may be embodied in a defect detector disposed at the signal reproducing pass. In this case, the defect setting condition may be employed as the parameter. In this arrangement, only in the case of the error generation inevitable with the default error correction, the selective alteration of the defect setting condition depending on the memory status assists the improvement in the error avoidance effect. Particularly, if the error is of caused by a flaw on the surface of the optical disc 100, the alteration of the defect setting condition is very effective to improve the error avoidance.

(Other Variations)

A combination of the second and third embodiment mentioned above is possible. That is, the RF equalizer 13 as an example of the signal processing device according to the second embodiment, and the spindle motor 19 as an example of the controllable moving device according to the third embodiment otherwise the servo control device or the defect detector as other examples of the controllable moving device according to the variation of the third embodiment may be provided in a combination of them, and the correction scheme or the repeating correction number in the error correction circuit 15, the characteristics of the RF equalizer 13, the rotation number of the spindle motor 19, or the servo gain may be altered in a desired combination for each case among the cases assumed depending on the memory status.

In any combination, the alteration depending on the memory status assists the total improvement in the error avoidance effect very effectively.

Incidentally, in the embodiment mentioned above, although discussed about the case in that the rotation number of the spindle motor 19 is decreased, increasing the rotation number is possible. For example, if the error is caused by the high rotation number, it is useful to decrease the rotation number. Conversely, it is useful to increase the rotation number, if there is a possibility of improvement in the error avoidance effect by shortening the apparent length of flaws on the surface of the optical disc 100. As long as the memory status in the buffering memory device 17 allows, first the error correction with the lowered rotating number may be re-tried, and then the error correction with the raised rotating number may be re-tried, if the error is not avoid by the precedent error correction. Particularly if the error cause is unknown, it is useful to retry the error correction with the various reproducing conditions, for example, raising the rotation number after lowering.

EXAMPLES

Figure 4:
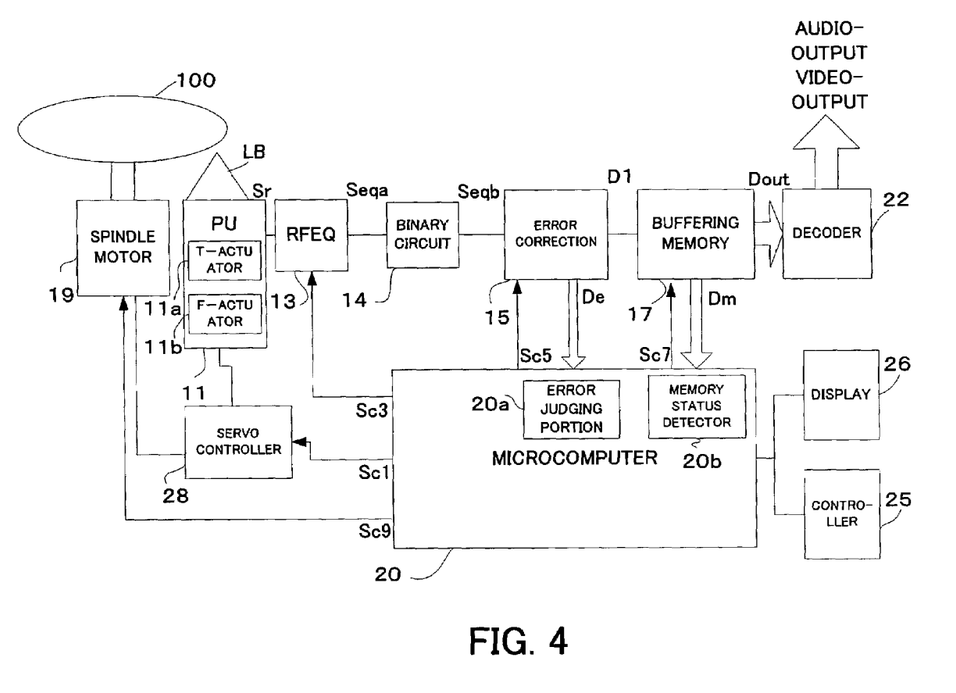
FIG. 4 is a block diagram showing an information reproducing apparatus according to an Example of the present invention.
Figure 5:
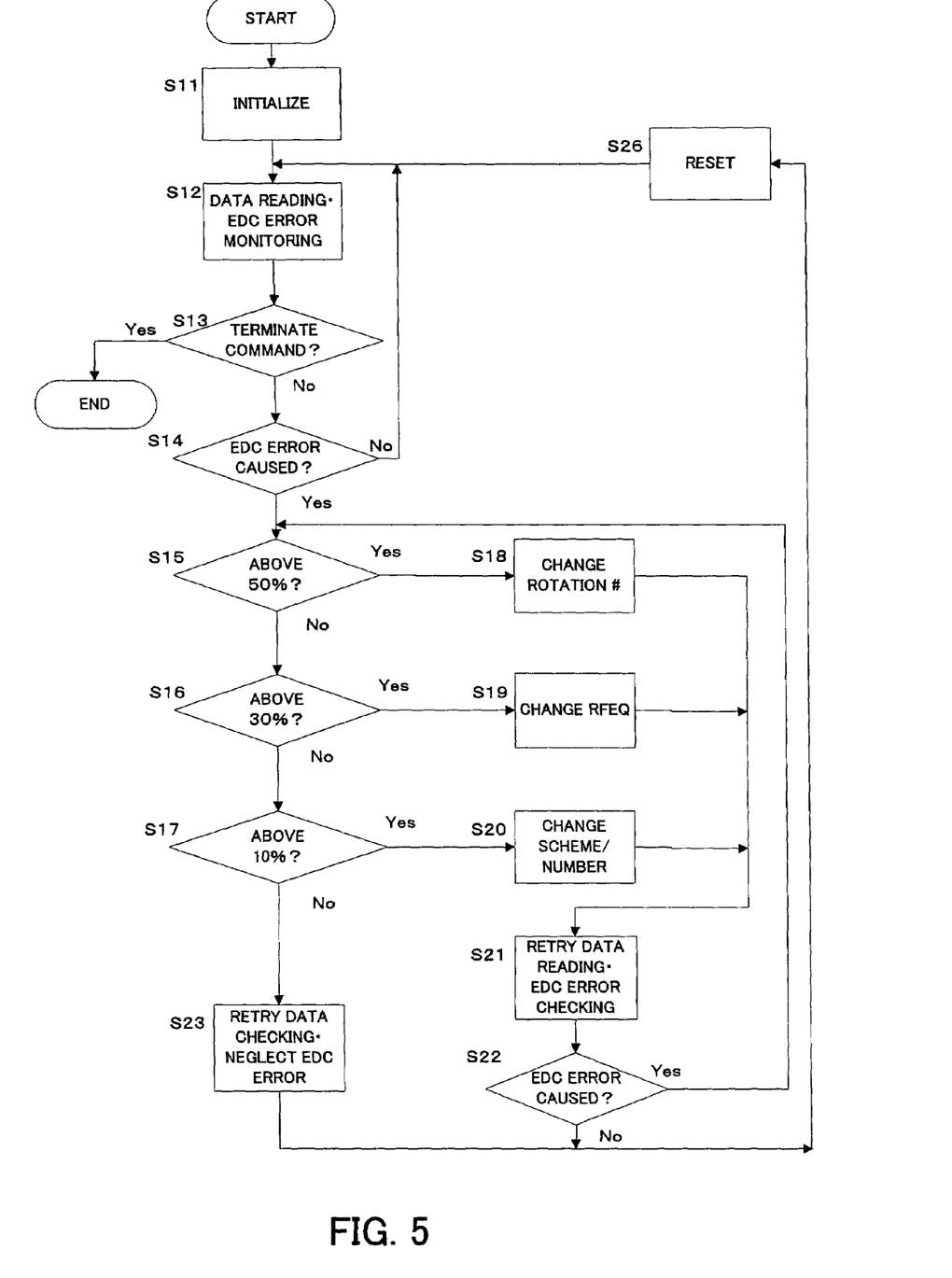
FIG. 5 is a flow chart showing an exemplary operation when a DVD as an optical disc is reproduced according to the Example of the present invention.
Figure 6:
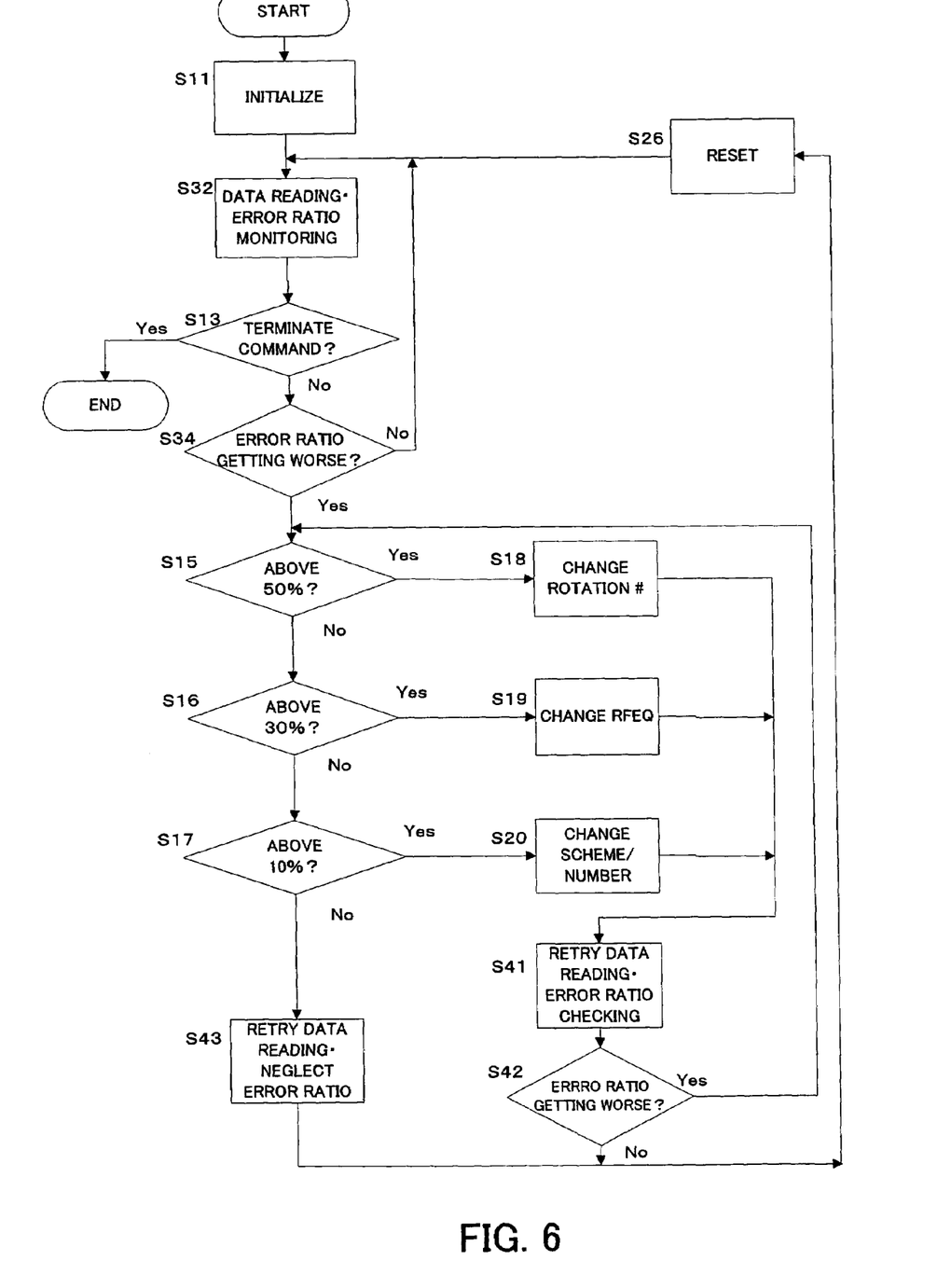
FIG. 6 is a flow chart showing an exemplary operation when a CD as an optical disc is reproduced according to the Example of the present invention.

The Examples of the information reproducing apparatus according to the present invention will now be discussed, referring to FIG. 4 to FIG. 6. FIG. 4 is a block diagram showing an Example. In FIG. 4, components same as those of the first to third embodiments indicated by FIG. 1 to FIG. 3 carry the same reference numerals, and the explanations thereof are omitted as appropriate. FIG. 5 is a flow chart illustrating an exemplary operation when a DVD as an optical disc is reproduced in the Example. FIG. 6 is a flow chart illustrating an exemplary operation when a CD as an optical disc is reproduced in the Example.

In FIG. 4, the information reproducing apparatus is provided with the optical pickup 11, the RF equalizer 13, the error correction circuit 15, the buffering memory device 17, the microcomputer 20 and the spindle motor 19 same as the above embodiments, and further provided with a binary circuit 14, a decoder 22, an operation unit 25, a display unit 26 and a servo controller 28.

The binary circuit 14 is arranged to binarize (digitalize) the equalized read signal Seqa outputted from the RF equalizer 13 and arranged to output the read signal Seqb, which has a rectangular shape, to the error correction circuit 15. The error correction circuit 15 is for performing the error correction process with respect to the read signal Seqb, similarly to either one of the above first to third embodiments.

The decoder 22 is for decoding the output data Dout outputted from the buffering memory device 17 to output (export) the contents data such as audio data or video data. Alternatively, the decoder 22 may be arranged to output such contents data to a D/A converter, an amplifier or the like, any of which is integrated within the information reproducing apparatus.

The operation unit 25 includes various switches, keys, a touch panel or a remote controller to serve as an interface to give a command relating to the reproduction of the optical disc 100.

The display unit 26 may be a small LCD (Liquid Crystal Display), an EL (Electro Luminescence) display or the like to display various type of information such as the operating condition of the information reproducing apparatus, the contents information of the optical discs 100 or the like.

The servo controller 28 is for the various servo operations, such as the control of the tracking actuator (T-actuator) 11a, the focus actuator (F-actuator) 11b in the optical pickup 11, a slider in a slider motor (not shown) and the spindle in the spindle motor 19, under control of the control signal Sc1 for the servo control from the microcomputer 20.

Also within the microcomputer 20, an error judging portion 20a for the judgement on the basis of the error information De from the error correction circuit 15 is logically constructed as well as a memory status judging portion 20b for the judgement in each case depending on the memory status on the basis of the memory status information Dm from the buffering memory device 17.

The error judging portion 20a is operative to judge whether or not any EDC error is detected in one ECC block, on the basis of the error information De, for example, if the optical disc 100 is a DVD, on the basis of the error existing in the read signal Seqb. Alternatively, for example, if the optical disc is a CD, the error judging portion 20a may judge whether or not the error ratio in the read signal Seqb becomes greater than the predetermined threshold value.

The memory status judging portion 20b is arranged to judge whether the memory status (i.e., the residual data) in the buffering memory device 17 is no less than 50% of the whole memory, less than 50% and no less than 30%, less than 30% and no less than 10%, or less than 10%.

Next, an exemplary operation when a DVD as an optical disc 100 is reproduced according to the above-mentioned Example will be discussed, with referring to FIG. 5. It is noted that the information reproducing apparatus according to the present invention may be embodied in a DVD player, or may be embodied in a CD/DVD compatible player. In addition to the reproducing function, a recording function may be provided, if desired.

Firstly in FIG. 5, an initial setting is executed to select the alteration to be performed against the error generation inevitable with the initial error correction at least by the microcomputer 20, from among the rotation number of the spindle motor 19, the frequency dependent gain characteristics and the cutoff frequency of the RF equalizer 13, the error scheme and the repeating correction number in the error correction circuit 15, the servo gain in the servo controller 28 and the defect setting in the defect detector (not shown) (step 11).

Next, a data reading from the optical disc 100 is executed by the optical pickup 11, the RF equalizer 13, the binary circuit 14, the error correction circuit 15 and so on. In the meantime, an EDC error monitoring is executed by the error correction circuit 15 and the error judging portion 20a (step S12).

The "EDC (Error Detection Code) error" herein means an error in the "ECC data" as the data unit for the error correction of the DVD. That is, two cases can be considered as the result of the error correction on the basis of the ECC data: (i) all of the ECC data can be identified, i.e. the data failed in the correction through the predetermined error correction does not exists; or (ii) all or part of the ECC data can not be identified, i.e. the data failed in the correction through the predetermined error correction exists.

In reproducing, a command input via the operation unit 25 to terminate the reproduction is performed, or the command recorded in the reproduced data to terminate the reproduction is detected (step S13). If the terminate command is inputted or detected (step S13: YES), a series of reproduction procedure is terminated.

On the other hand, if the terminate command is not detected (step S13: NO), the error judging portion 20a judges whether or not the EDC error is caused (step S14). If the error that is caused at the present can be corrected through the error correction in the error correction circuit 15 under conditions that is preset at the step S11, i.e. if the error avoidance effect is sufficient to correct the error at the present, it is judged that the EDC error is not caused (step S14: NO). In this case, the process goes back to the step S12 to continue the data reading and the EDC error monitoring.

Conversely, the error that is caused at the present can not be corrected through the error correction in the error correction circuit 15 under conditions that is preset at the step S11, i.e. if the error avoidance effect is not sufficient to correct the error at the present, it is judged that the EDC error is caused (step S14: YES). In this case, the memory status judging portion 20b executes the memory status judging at the steps S15 to S17, as follows.

That is, firstly, it is judged whether or not the memory status (i.e., the data amount or level of the residual data in the buffering memory device) is not less than 50% of the whole memory capacity, on the basis of the memory status information Dm (step S15). If the memory status is less than 50% (step S15: NO), it is judged whether or not the memory status is not less than 30% (step S16). In other words, it is judged whether or not the memory status is less than 50% and not less than 30%. If the memory status is less than 30% (step S16: NO), it is judged whether or not the memory status is not less than 10% (step S17). In other words, it is judged whether or not the memory status is less than 30% and not less than 10%.

At the step S15, if the memory status is not less than 50% (step S15: YES), the buffering memory device 17, which may have the capacity of 4 megabits, 16 megabits etc., is in a state near fully stored. There is a relatively long period of time such as for a few to over ten seconds, depending on the memory size, until the buffering memory 17 becomesempty (i.e., until the residual data in the buffering memory 17 becomes zero). Therefore, in this case, the rotation number of the spindle motor 19, which takes a relatively long period in the order of one second or less and tends to influence the error cause in a rather great extent, is altered (step S18). For example, in case of the approximately 4,000 rps as the initial setting or the normal setting value, the rotation number may be decreased to 2,000 rps. Alternatively, it may be increased to 6,000 rps.

On the other hand, at the step S16, if the memory status is not less than 30% (step S16: YES), the buffering memory device 17 is in a state rather far from fullstored. There is a fairly long period of time such as for a few seconds, depending on the memory size, until the buffering memory becomes empty. Therefore, in this case, the gain characteristics of the RF equalizer 13 or the cutoff frequency, which takes a certain period of time approximately from a few microseconds to less than one second and tends to influence the error cause in a rather great extent, is altered (step S19). For example, in case of the lower gain in the order of 3 dB as the initial setting or the normal setting value, the gain may be increased to the higher gain in the order of 6 dB.

On the other hand, at the step S17, if the memory status is not less than 10% (step S17: YES), there is in the buffering memory device 17 a short period of time approximately from a few microseconds to less than one second until the buffering memory becomes empty, depending on the memory size. Therefore, in this case, at least one of the correction scheme and the repeating correction number in the error correction circuit 15, which takes the short period in the order of a few microseconds and tends to influence the error cause in a rather great extent, is altered (step S20). For example,in case of the combination of the C2 correction after the C1 correction as the initial setting or the normal setting scheme, it may be altered to another combination of the C2 correction as first, the C1 correction as second and the C2 correction as third.

After the alteration in either one of the steps S18 to S20, the data reading is executed again by the optical pickup 11, the RF equalizer 13, the binary circuit 14, the error correction circuit 15 and so on with respect to the data in the ECC block failed in the precedent error corrections. In the meantime, the error correction circuit 15 and the error judging portion 20a check the EDC error (step S21).

Next, the error judging portion 20a judges whether or not the EDC error is caused (step S22). If the error that is caused at the present can be corrected through the error correction in the error correction circuit 15 under conditions that is altered in either one of the steps S18 to S20, i.e. if the error avoidance effect is sufficient to correct the error at the present, it is judged that the EDC error is not caused (step S22: NO). In this case, the process goes to the step S26 to reset the conditions altered in either one of the steps S18 to S20 (step S26) and goes back to the step 12 to continue the data reading of the data to be read successively and the EDC error monitoring.

Conversely, if the error that is caused at the present can not be corrected through the error correction in the error correction circuit 15 under conditions that is altered in either one of the steps S18 to S20, i.e. if the error avoidance effect is not sufficient to correct the error at the present, it is judged that the EDC error is caused (step S22: YES). In this case, the process goes back to the step S15 to repeat the above-mentioned steps S15 to S22.

On the other hand, the buffering memory device 17 is becoming empty (i.e., the residual data in the buffering memory device 17 becomes zero) while the alteration in either one of the steps S18 to S20 and the data reading at the step S21 are repeated. Therefore, if the error correction with respect to an ECC block is impossible, it is judged that the memory status is less than 10% (step S17: NO). In this case, to prevent the buffering memory device 17 from becoming empty, the data reading is executed again by the optical pickup 11, the RF equalizer 13, the binary circuit 14, the error correction circuit 15 and so on with respect to the ECC data failed in the precedent error correction. In this case, the process goes to the step S26, neglecting the EDC error (step S23).

Incidentally, at the step S23, instead of repeating the data reading, the process may go to the step S26, using the data already read in the precedent step without processing or abandonment.

According to the present Example, as discussed above, in case that the EDC error is caused during the reproduction of a DVD as the optical disc 100, since the rotation number of the spindle motor 19, the gain characteristics of the RF equalizer 13, or the correction scheme/the repeating correction number in the error correction circuit 15 is selectively altered depending on the memory status, the error avoidance effect can be remarkably and efficiently improved, with the aid of storage capacity of the buffering memory device 17.

Next, an exemplary operation in case that a CD as the optical disc is reproduced according to the above-mentioned Example will be discussed, with referring to FIG. 6. The information reproducing apparatus according to the present invention may be embodied in a CD player, or may be embodied in a CD/DVD compatible player. In addition to the reproduction function, a recording function may be provided, if desired.

In FIG. 6, steps same as those of the reproductive operation shown in FIG. 5 carry the same reference numerals, and the explanations thereof are omitted as appropriate.

Firstly in FIG. 6, the initial setting is performed, similar to the case of FIG. 5 (step S11).

Next, the data reading is executed by the optical pickup 11, the RF equalizer 13, the binary circuit 14, the error correction circuit 15 and so on. In the meantime, the error correction circuit 15 and the error judging portion 20a execute the error ratio monitoring (step S32).

The "error ratio" herein means a ratio, such as a ratio of error frame numbers to the total frame numbers within a predetermined time unit. If the error ratio becomes greater than a predetermined threshold value, the generation of the error becomes so remarkable that the problem in the quality of the reproduced sound can be predicted for example. Therefore, if the error ratio becomes greater than the predetermined threshold value, the error correction is to be retried under an altered reproducing condition. In the Example, the concrete value of the predetermined threshold value to judge the error generation on the basis of the error ratio may be determined experimentally, empirically, logically or via a simulation, depending on the individual specification and/or ability of the information reproducing apparatus.

Then, the terminate command judgement is executed, similar to the case of FIG. 5 (step S13).

Next, if the terminate command is not inputted or detected (step S13: NO), the error judging portion 20a judges whether or not the error ratio is getting worse, i.e. whether or not the error ratio based on the error information De outputted from the error correction circuit 15 becomes greater than the predetermined threshold value (step S34). If the error that is caused at the present can be corrected through the error correction in the error correction circuit 15 under conditions that is preset at the step S11, i.e. if the error avoidance effect is sufficient to correct the error at the present, it is judged that the error ratio is not getting worse (step S34: NO). In this case, the process goes back to the step S32 to continue the data reading and the error ratio monitoring.

Conversely, if the error that is caused at the present can not be corrected through the error correction in the error correction circuit 15 under conditions that is preset at the step S11, i.e. if the error avoidance effect is not sufficient to correct the error at the present, it is judged that the error ratio is getting worse (step S34: YES). In this case, similar to the case of FIG. 5, the memory status judgement in the steps S15 to S17 and the alteration in the steps S18 to S20 are executed.

After the alteration in either one of the steps S18 to S20, the data reading is executed again by the optical pickup 11, the RF equalizer 13, the binary circuit 14, the error correction circuit 15 and so on with respect to the data failed in the precedent error corrections. In the meantime, the error correction circuit 15 and the error judging portion 20a execute the error ratio checking (step S41).

Next, the error judging portion 20a judges whether or not the error ratio is getting worse (step S42). If the error that is caused at the present can be corrected through the error correction in the error correction circuit 15 under conditions that is altered in either one of the steps S18 to S20, i.e. if the error avoidance effect is sufficient to correct the error at the present, it is judged that the error ratio is not getting worse (step S42: NO). In this case, the process goes to the step S26 to reset the conditions altered in either one of the steps S18 to S20 (step S26) and goes back to the step 32 to continue the data reading of the data to be read successively and the error ratio monitoring.

Conversely, if the error that is caused at the present can not be corrected through the error correction in the error correction circuit 15 under conditions that is altered in either one of the steps S18 to S20, i.e. if the error avoidance effect is not sufficient to correct the error at the present, it is judged that the error ratio is getting worse (step S42: YES). In this case, the process goes back to the step S15 to repeat operation in the above-mentioned steps S15 to S22 and steps S41 and S42.

On the other hand, the buffering memory device 17 is becoming empty while the alteration in either one of the steps S18 to S20 and the data reading at the step S41 are repeated. Therefore, if the error correction with respect to data in an ECC block is impossible, it is judged that the memory status is less than 10% (step S17: NO). In this case, to prevent the buffering memory device 17 from becoming empty, the data reading is executed again by the optical pickup 11, the RF equalizer 13, the binary circuit 14, the error correction circuit 15 and so on with respect to the data failed in the precedent error correction. In this case, the process goes to the step S26, neglecting the error ratio (step S43).

Incidentally, at the step S43, instead of repeating the data reading, the process may go to the step S26, using the data that has been already read in the precedent step without processing or abandonment.

In the above-mentioned embodiments, although the error ratio monitoring by the error correction circuit 15 and the error judging portion 20a has been discussed, the error ratio may be replaced by an error flag as the object of monitoring. The "error flag" herein is for indicating whether or not the error is corrected in the error correction, and for acting as an indicator of a fact that the error ratio becomes greater than the predetermined threshold value. That is, the error flag is provided, in case that the problem in the sound quality when reproduced with the remarkable generation of errors is predicted. For example, at the step S32 of the flow chart shown in FIG. 6, the flag indicating whether or not the error is corrected may be monitored. Furthermore, if the error that is caused at the present can not be corrected even repeatedly through the error correction in the error correction circuit 15 under conditions that is preset at the step S11, i.e. if the error avoidance is not sufficient to correct the error at the present, it is detected that the flag indicating the failure in the error correction (the impossibility of the error correction) at the step S34 exists. In this case, similar to the case of FIG. 5, the memory status judgment in the steps S15 to S17 and the alteration in the steps S18 to S20 are executed.

According to the present Example, as discussed above, since the rotation number of the spindle motor 19, the gain characteristics of the RF equalizer 13, or the correction scheme/the repeating correction number in the error correction circuit 15 is selectively altered depending on the memory status, the error avoidance can be remarkably and efficiently improved, with the aid of storage capacity of the buffering memory device 17, even if the error ratio is getting worse during the reproduction of a CD as the optical disc 100.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-225742 filed on Aug. 2, 2002 including the specification, claims, drawings and summary is incorporated herein by reference in its entirety.

What is claimed is:

1. An information reproducing apparatus comprising:
a reading device for reading record information recorded on a recording medium and outputting a read signal;
an error correcting device for executing an error correction process with respect to the outputted read signal and outputting output data through the error correction process corresponding to the record information;
a memory device for buffering the output data; and
a correction controlling device for altering the error correction process in said error correcting device depending on a memory status of said memory device, if in said error correcting device, an error is detected in the read signal and/or if an error ratio of the error becomes greater than a predetermined threshold value,
wherein said memory device outputs at least temporarily the output data through the error correction process that is altered by said correction controlling device, if the error is detected and/or if the error ratio becomes greater than the predetermined threshold value.

2. The information reproducing apparatus according to claim 1, wherein the memory status of said memory device indicates data amount or level of the output data presently stored in said memory device.

3. The information reproducing apparatus according to claim 1, wherein
said memory device outputs a memory status information indicating the memory status to said correction controlling device, and
said correction controlling device alters the error correction process depending on the memory status indicated by the memory status information.

4. The information reproducing apparatus according to claim 1, wherein
said error correcting device outputs error information indicating the error detected in the read signal, and
said correction controlling device includes a judging device for judging whether or not the error is detected and/or whether or not the error ratio becomes greater than the predetermined threshold value.

5. The information reproducing apparatus according to claim 1, further comprising a signal processing device for executing a certain kind of signal process with respect to the read signal before the error correction process,
wherein said correction controlling device alters the signal process in said signal processing device depending on the memory status in place of or in addition to the error correction process, if the error is detected and/or if the error ratio becomes greater than the predetermined threshold value.

6. The information reproducing apparatus according to claim 5, wherein said signal processing device includes an equalizer for executing an equalizing process as the signal process with respect to the read signal.

7. The information reproducing apparatus according to claim 5, wherein said correction controlling device assumes two cases on the basis of a comparison of the memory status, which indicates data amount or level of the output data presently stored in said memory device, with a first predetermined value, and, in one case, alters the error correction process, and in the other case, alters the signal process.

8. The information reproducing apparatus according to claim 1, further comprising a variable moving device capable of moving with a variable parameter to define a part of reproducing conditions for the information reproducing apparatus,
wherein said correction controlling device alters the parameter for said variable moving device depending on the memory status in place of or in addition to the error correction process, if the error is detected and/or if the error ratio becomes greater than the predetermined threshold value.

9. The information reproducing apparatus according to claim 8, wherein said variable moving device includes a spindle motor for rotating the recording medium with a predetermined rotation number as the parameter.

10. The information reproducing apparatus according to claim 8, wherein said variable moving device includes a servo control device for executing a servo control with respect to said reading device with a predetermined servo gain as the parameter.

11. The information reproducing apparatus according to claim 8, wherein said variable moving device includes a defect detecting device for executing a defect detection with respect to the read signal under a predetermined defect setting condition as the parameter.

12. The information reproducing apparatus according to claim 8, wherein said correction controlling device assumes two cases on the basis of a comparison of the memory status, which indicates data amount or level of the output data presently stored in said memory device, with a second predetermined value, and, in one case, alters the error correction process, and in the other case, alters the parameter.

13. The information reproducing apparatus according to claim 1, further comprising:
a signal processing device for executing a certain kind of signal process with respect to the read signal before the error correction process; and a variable moving device capable of moving with a variable parameter to define a part of reproducing conditions for the information reproducing apparatus, wherein said correction controlling device alters at least one of the signal process at the signal processing device and the parameter for said variable moving device depending on the memory status in place of or in addition to the error correction process, if the error is detected and/or if the error ratio becomes greater than the predetermined threshold value.

14. The information reproducing apparatus according to claim 13, wherein said correction controlling device assumes three cases on the basis of a comparison of the memory status, which indicates data amount or level of the output data presently stored in said memory device, with a first predetermined value as well as the memory status with a second predetermined value, and, in a first case, alters the error correction process, in a second case, alters the signal process, and in a third case, alters the parameter.

15. The information reproducing apparatus according to claim 1, wherein said correction controlling device alters the error correction process depending on the memory status, by altering at least one of a correction scheme and a repeating correction number of the error correction process.

16. The information reproducing apparatus according to claim 1, wherein it is judged for each unit of data block for the error correction, which is set in advance, whether or not the error is detected and/or whether or not the error ratio becomes greater than the predetermined threshold value.

17. The information reproducing apparatus according to claim 1, wherein said correction controlling device alters at least one of the error correction process, the signal process and the parameter, while preventing the memory status, which indicates data amount or level of the output data presently stored in said memory device, from becoming zero.

18. The information reproducing apparatus according to claim 1, wherein said correction controlling device terminates repeating the error correction process and controls said memory device to output the output data before the memory status, which indicates data amount or level of the output data presently stored in said memory device, becomes zero, if the error is detected and/or if the error ratio becomes greater than the predetermined threshold value, even after the error correction process is repeated a plenty of times with respect to the same record information.

19. The information reproducing apparatus according to claim 1, wherein said correction controlling device repeats altering until the error is not detected and/or until the error ratio becomes less than the predetermined threshold value.

20. The information reproducing apparatus according to claim 1, wherein, if the error is not detected and/or if the error ratio becomes less than the predetermined threshold value after executing the error correction process with altering at least one of the error correction process, the signal process and the parameter, said correction controlling device reset the altered one to an initial status thereof.

21. An information reproducing method comprising the processes of:

reading record information recorded on a recording medium and outputting a read signal;

executing an error correction process with respect to the outputted read signal and outputting output data through the error correction process corresponding to the record information;

buffering the outputted output data using a memory device; and altering the error correction process depending on a memory status of said memory device, if in the error correcting process, an error is detected in the read signal and/or an error ratio of the error becomes greater than a predetermined threshold value, wherein the output data through the error correction process that is altered at said altering process is outputted at least temporarily from said memory device, if the error is detected and/or if the error ratio becomes greater than the predetermined threshold value.

22. An error correction system provided for an information reproducing apparatus having a reading device for reading record information recorded on a recording medium and outputting a read signal, said error correction system comprising:

an error correcting device for executing an error correction process with respect to the outputted read signal and outputting output data through the error correction process corresponding to the record information;

a memory device for buffering the outputted output data; and a correction controlling device for altering the error correction process in said error correcting device depending on a memory status of said memory device, if in said error correcting device, an error is detected in the read signal and/or if an error ratio of the error becomes greater than a predetermined threshold value, wherein said memory device outputs at least temporarily the output data through the error correction process that is altered by said correction controlling device, if the error is detected and/or if the error ratio becomes greater than the predetermined threshold value.

* * * * *